United States Patent [19]

Shiraishi et al.

[11] 4,314,345
[45] Feb. 2, 1982

[54] CONTROLLING THE INJECTION OF AMMONIA IN A DRY TYPE EXHAUST GAS DENITRATION PROCESS

[75] Inventors: Yoshihiro Shiraishi; Naohiko Ukawa, both of Hiroshima, Japan

[73] Assignee: Mitsubishi Jukogyo Kabushiki Kaishi, Tokyo, Japan

[21] Appl. No.: 172,853

[22] Filed: Jul. 28, 1980

Related U.S. Application Data

[63] Continuation-in-part of Ser. No. 2,805, Jan. 11, 1979, abandoned.

[30] Foreign Application Priority Data

Jan. 23, 1978 [JP] Japan .................................. 53-5835

[51] Int. Cl.³ ..................... G05D 11/02; G01D 53/34
[52] U.S. Cl. .................................. 364/500; 364/503; 422/111; 423/235
[58] Field of Search ....................... 60/274, 285, 286; 422/105, 110, 111; 423/235, 239 A; 364/500, 503

[56] References Cited

U.S. PATENT DOCUMENTS

| | | | |
|---|---|---|---|
| 3,599,427 | 8/1971 | Jones et al. | 60/274 |
| 3,846,981 | 11/1974 | Paczkowski | 60/286 |
| 4,112,053 | 9/1978 | Sanada et al. | 423/239 A |
| 4,188,190 | 2/1980 | Muraki et al. | 422/111 X |
| 4,208,381 | 6/1980 | Isahaya et al. | 422/111 X |

FOREIGN PATENT DOCUMENTS

2754932 6/1978 Fed. Rep. of Germany ... 423/239 A
2803876 8/1978 Fed. Rep. of Germany ...... 423/235

Primary Examiner—Felix D. Gruber
Attorney, Agent, or Firm—Wenderoth, Lind & Ponack

[57] ABSTRACT

In a first processor unit the relationship between the amount of nitrogen oxides in a combustion exhaust gas and a numerical value representing an amount of combustion, e.g. - fuel flow rate or the like, is stored. In a second processor unit the ratio of ammonia to nitrogen oxides as a function of the combustion exhaust gas temperature is stored. A numerical value corresponding to the actual measured amount of combustion is inputted to the first processor unit to derive the amount of nitrogen oxides in the combustion exhaust gas. The actual measured combustion exhaust gas temperature is inputted to the second processor unit to derive the ratio of ammonia to nitrogen oxides. The optimum amount of ammonia to be injected is derived by multiplying the amount of nitrogen oxides, derived by means of the first processor unit, by the ratio of ammonia to nitrogen oxides derived by means of the second processor unit. In a preferable embodiment of the present invention, the ratio of ammonia to nitrogen oxides is corrected before the multiplication by means of a correction factor which is stored in a third processor unit and which corresponds to a time variation rate of the combustion exhaust gas temperature.

4 Claims, 17 Drawing Figures

BASIC CIRCUIT DIAGRAM OF DA
FIG. 8

ABSOLUTE VALUE CIRCUIT
FIG. 9

TEST WIRING DIAGRAM
FIG. 10

OUTPUT RESPONSE CURVE
FIG. 11

BASIC CIRCUIT DIAGRAM
FIG. 12

FIG. 13

METHOD FOR ADJUSTMENT

CONTROLLING THE INJECTION OF AMMONIA IN A DRY TYPE EXHAUST GAS DENITRATION PROCESS

CROSS-REFERENCE TO RELATED APPLICATION

This application is a continuation-in-part application of U.S. application Ser. No. 2,805, filed Jan. 11, 1979, now abandoned.

BACKGROUND OF THE INVENTION

1. Field of the Invention

The present invention relates to a system and method for controlling the injection of ammonia in a dry type exhaust gas denitration process.

2. Description of the Prior Art

In general, among the conventional dry type of exhaust gas denitration processes, the most predominant process is the catalytic denitration process in which nitrogen oxides (hereinafter represented by $NO_x$) contained in a combustion exhaust gas and ammonia (hereinafter represented by $NH_3$) injected from outside of the system and mixed with the exhaust gas make a catalytic reaction with an activator located on a catalyzer surface; the catalytic reaction decomposes the gas and ammonia into harmless nitrogen and water. Also, a non-catalytic denitration process in which $NO_x$ and $NH_3$ make a vapor phase reaction at a high temperature region so as to be decomposed, is being developed up to the stage of practical utilization.

On the other hand, most of $NO_x$ contained in a combustion exhaust gas is actually NO, and the proportion of NO to $NO_x$ will vary somewhat depending upon temperature conditions such as combustion temperature or the like. However, in the denitration processes described above, an equivalent reaction between NO and $NH_3$, that is, a reaction of:

$$4NO + 4NH_3 + O_2 \rightleftarrows 4N_2 + 6H_2O$$

is deemed to be the principal reaction, and so, $NO_x$ is decomposed and removed while injecting, under automatic control, $NH_3$ proportional to the $NO_x$ equivalent to be decomposed or to a somewhat larger amount of $NO_x$.

In the prior art method for controlling the injection of $NH_3$, the amount of $NO_x$ in a combustion exhaust gas was detected by multiplying the $NO_x$ concentration by the combustion exhaust gas flow rate, and the amount of injection of $NH_3$ was set by multiplying the detected amount of $NO_x$ by the intended $NH_3/NO_x$ ratio. Since the $NH_3/NO_x$ ratio was manually set or fixedly set, the ratio was kept constant. However, the above-described prior art method for controlling the injection of $NH_3$ had the following shortcomings:

(1) Though the $NO_x$ concentration is detected by means of an automatic analyzer, before the results of the measurement are converted into transmission signals and then outputted, a delay of one minute or more exists due to the delays inherent in the analyzer system, (for example, a delay caused by the replacement of gas in a sampling line), so that a considerable delay occurs in the control of the $NH_3$ injection amount, and accordingly, the proper denitration operation cannot follow any abrupt system parameter changes.

(2) The denitration reaction speed between $NO_x$ and $NH_3$ will vary depending upon temperature, and also the temperature dependency of the denitration operation will vary depending upon the kind of catalyzer used, so that in case where the $NH_3/NO_x$ ratio is constant, the optimum denitration rate cannot be always obtained.

(3) When the combustion exhaust gas temperature becomes low (for instance, 300° C. or lower), a poisoning effect for the catalyzer will arise due to absorption of $NH_3$ onto the catalyzer surface and due to the ammonium salt formed by the reaction between $SO_x$ in the combustion exhaust gas and $NH_3$, so that it is necessary to lower the $NH_3/NO_x$ ratio, and in prior art methods, it was sometimes necessary to stop the injection of $NH_3$ at low exhaust gas temperatures, interrupting the denitration process.

(4) In addition, as the temperature is lowered, the amount of absorption of $NH_3$ onto the catalyzer surface is increased, and upon a temperature rise, the $NH_3$ absorbed during the low temperature is released and dispersed in the gas, so that the $NH_3/NO_x$ ratio in the gas is raised, resulting in the phenomenon that $NH_3$ is released with the gas at the outlet of the denitration apparatus. Therefore, not only is there an adverse effect on associated instruments succeeding the outlet of the denitration apparatus, (for example, an air heater), but also the released $NH_3$ may possibly become a public nuisance.

BRIEF SUMMARY OF THE INVENTION

The present invention overcomes the above-described shortcomings, and provides a method for controlling the injection of $NH_3$ so that the $NH_3/NO_x$ ratio is adjusted to optimize the denitration process.

More particularly, the present invention includes a system and method for controlling the injection of $NH_3$ in a dry type exhaust gas denitration process in which $NH_3$ is injected into and mixed with a combustion exhaust gas containing $NO_x$ to decompose and remove said $NO_x$, characterized in that an optimum amount of injection of $NH_3$ is derived, respectively, by the following:

(1) use is made of at least a first processor unit in which on the basis of the relationship between the produced $NO_x$ concentration and the numerical value representing an amount of combustion, such as the fuel flow rate, the combustion air flow rate, the combustion exhaust gas flow rate, the water supply flow rate or the generated vapor flow rate, derives and stores the amount of $NO_x$ as a function of said numerical value representing the amount of combustion, and use is made of a second processor unit in which on the basis of the relationship between the combustion exhaust gas temperature and the denitration performance, derives and stores the $NH_3/NO_x$ ratio as a function of said combustion exhaust gas temperature; the amount of $NO_x$ obtained by inputting said numerical value representing the amount of combustion to said first processor unit is multiplied by the $NH_3/NO_x$ ratio obtained by inputting the combustion exhaust gas temperature or the numerical value corresponding to the combustion exhaust gas temperature to said second processor unit;

(2) use is made of at least a first processor unit, a second processor unit and a third processor unit in which on the basis of the relationship between the time variation rate of the combustion exhaust gas temperature and the $NH_3/NO_x$ ratio, a characteristic factor for correcting the $NH_3/NO_x$ ratio as a function of said time variation rate is derived and stored; the amount of $NO_x$ is obtained by inputting said numerical value representing the amount of combustion to said first processor unit is multiplied by the $NH_3/NO_x$ ratio obtained by inputting the combustion exhaust gas temperature or the numerical value corresponding to the combustion exhaust gas temperature to said second processor unit and correcting the $NO_x$ amount by means of said third process unit.

DESCRIPTION OF THE DRAWINGS

The present invention will be described below in greater detail with reference to the accompanying drawings, in which.

DESCRIPTION OF THE PREFERRED EMBODIMENTS

Processors I–III described below are commercially available units and for the sake of brevity, their operation has not been discussed in great detail in the specification. Appendix I is an English translation of pertinent portions of the operating manual of the actual processors used in the present invention. Appendix II contains additional information regarding the operation of Processors I–III.

Figure 1A:
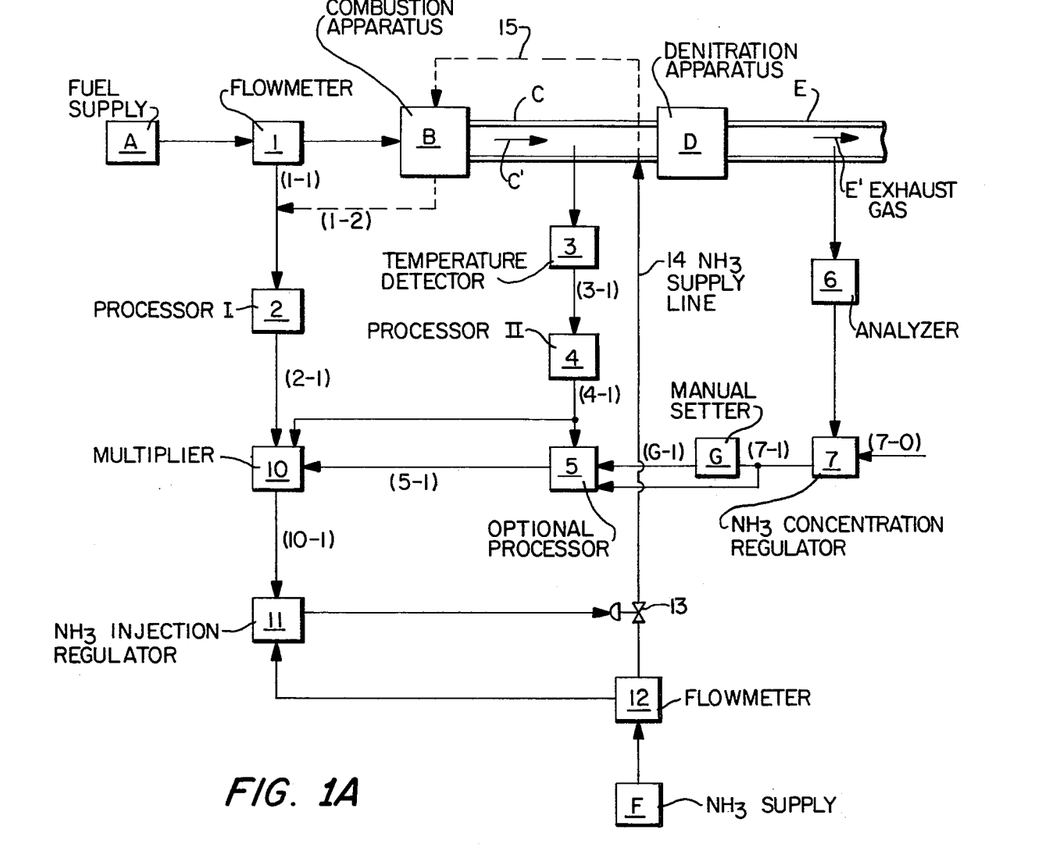
FIGS. 1A and 1B are flow diagrams showing one preferred embodiment of the present invention.
Figure 1B:
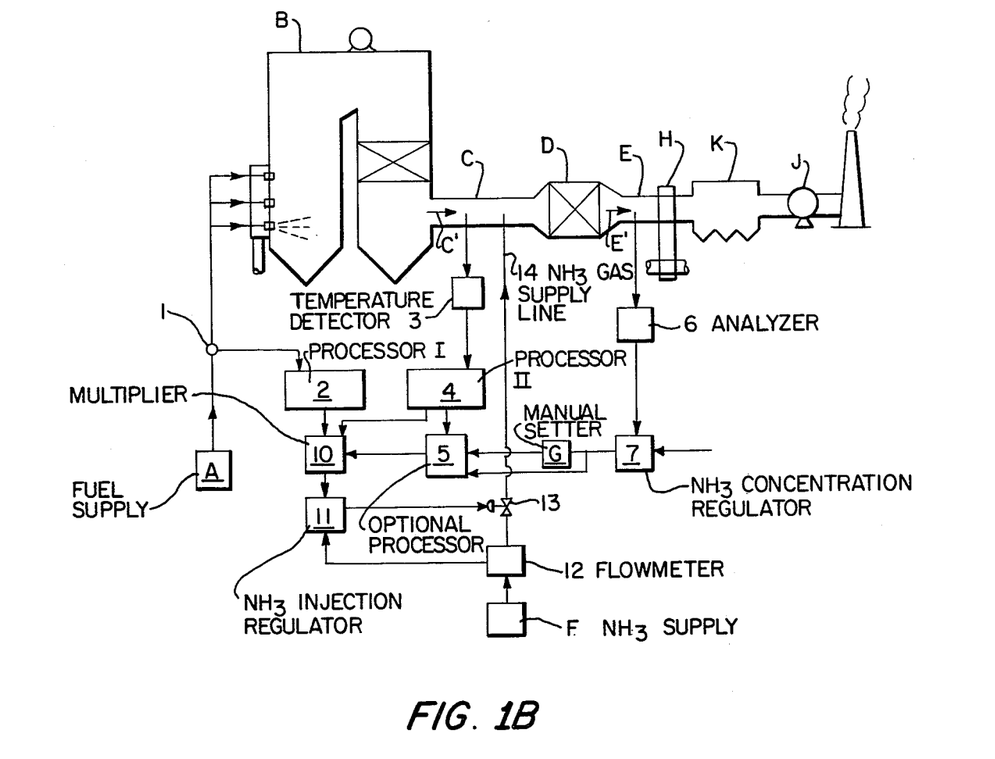

Referring now to FIGS. 1A and 1B, in which FIG. 1B is equivalent to FIG. 1A but includes some schematic structural representation of the combustion system, fuel A is fed to a combustion apparatus B, such as a sintering oven, a burning furnace, etc., the combustion exhaust gas C', generated in the combustion apparatus B and containing $NO_x$ is mixed with $NH_3$ in flue C for reducing and decomposing the $NO_x$ that is fed through a line 14; the mixture is then fed to denitration apparatus D, where the mixed gas makes contact with a catalyzer used for denitration and having a granular, honeycomb-like, tubular or planar shape, whereby $NO_x$ is decomposed into nitrogen and water, and thereafter, the gas is discharged as the processed exhaust gas E' from a flue E through an air preheater H, a dust collector K and a suction fan J to the exterior of the system.

In the above-referred denitration apparatus, the denitration performance will vary depending upon the temperature characteristics of the catalyzer activity, and accordingly, the reaction rate between $NO_x$ and $NH_3$ is not constant. For example, in the case where the $NH_3/NO_x$ ratio is constant, the relationship between the combustion exhaust gas temperature at the catalyzer and the denitration rate the combustion exhaust gas flow rate are as shown in FIG. 2.

Figure 2:
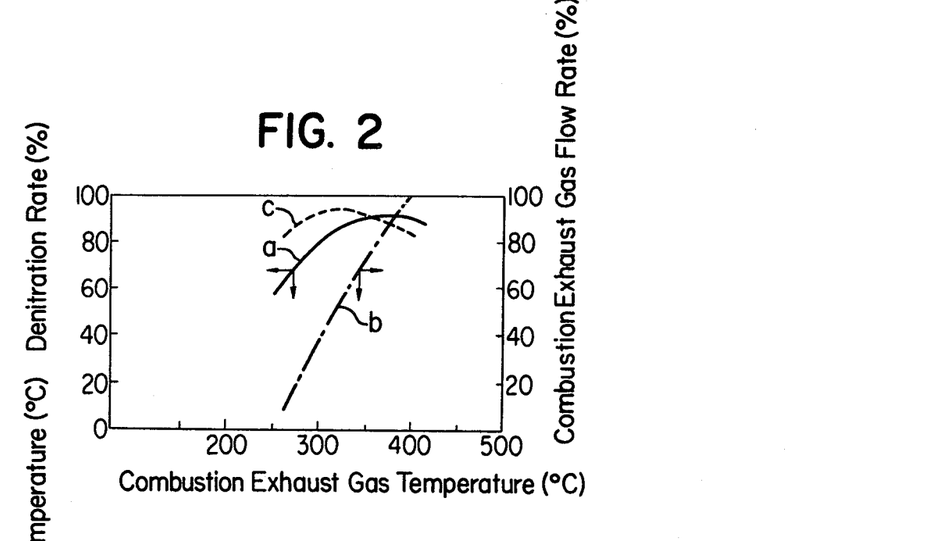
FIG. 2 is a graph showing the relationship of the combustion exhaust gas temperature to the combustion exhaust gas flow rate and the denitration rate.

More particularly, in FIG. 2, a solid line curve a represents the relationship between the combustion exhaust gas temperature and the denitration rate when a combustion exhaust gas flow rate is constant, and as will be seen from this curve the denitration rate is enhanced as the combustion gas temperature rises. However, under the condition of a rising combustion exhaust gas temperature, that is, under a heavy load condition, the combustion exhaust gas flow rate generally rises as shown by a broken line curve b, and if the combustion exhaust gas flow rate rises, in the case of a constant combustion exhaust gas temperature, the denitration rate is generally lowered (not shown). Accordingly, in the practical relationship between the combustion exhaust gas temperature and the denitration ratio, a low denitration rate occurs at a high temperature and at a low temperature as shown by a dotted line curve c, and otherwise, the denitration rate presents a substantially flat temperature dependency.

Therefore, in the present invention, on the basis of the relationship between the temperature of the combustion exhaust gas C' and the denitration performance, the $NH_3/NO_x$ ratio is derived as a function of the combustion exhaust gas temperature so that during a heavy load, high temperature operation, the $NH_3/NO_x$ ratio may be raised to prevent lowering of the denitration rate, while during a light load, low temperature operation, the $NH_3/NO_x$ ratio may be lowered to reduce the amount of absorption of $NH_3$ onto the catalyzer; the derived $NH_3/NO_x$ ratio is stored as a function of the combustion exhaust gas temperature in the processor (II) designated by reference numeral 4 in FIG. 1A.

An output signal (1-1) from a flow meter 1 for the fuel A or a signal (1-2) corresponding to the water supply flow rate or the evaporated steam flow rate is inputted to a function generator or processor (I) designated by reference numeral 2 in FIG. 1A in which the product of the flow rate of the combustion exhaust gas C' and the $NO_x$ concentration, that is, the amount of $NO_x$ is stored as a function of the combustion condition (that is, the fuel flow rate, the combustion air flow rate, etc.), and an $NO_x$ amount signal (2-11) is thereby generated and transmitted to a multiplier 10. On the other hand, the output signal (3-1) from a temperature detector 3 used for measuring the combustion exhaust gas C' is converted by the temperature characteristics processor 4, (that is, the processor (II)), into an $NH_3/NO_x$ characteristic signal (4-1). If necessary, this signal (4-1) is transmitted to a processor 5, where it is multiplied by the desired $NH_3/NO_x$ ratio signal (G-1), transmitted from a conventional manual setter G. It is to be noted that this ratio can be arbitrarily and manually set by means of the setter G and is used when it is intended to obtain an arbitrary desired denitration rate. Processor 5 derives an $NH_3/NO_x$ ratio signal (5-1), which is subsequently transmitted to the multiplier 10, or otherwise, the $NH_3/NO_x$ characteristic signal (4-1) is directly transmitted to the multiplier 10. In the multiplier 10, the $NO_x$ amount signal (2-1) is multiplied by the $NH_3/NO_x$ characteristic signal (4-1) or the $NH_3/NO_x$ ratio signal (5-1) to generate the $NH_3$ supply set signal (10-1). This signal (10-1) is transmitted to an $NH_3$ injection amount regulator 11 which controls a regulator valve 13. The flow rate of ammonia ($NH_3$) F is also detected by a flow meter 12, and the detected signal is transmitted to the $NH_3$ injection amount regulator 11 for control purposes.

The aforementioned temperature signal (3-1) of the combustion exhaust gas C' can be replaced by a signal (1-2) indicating the numerical value corresponding to the combustion exhaust gas temperature, (for example, the numerical value representing an amount of combustion such as the fuel flow rate, the combustion air flow rate or the combustion exhaust gas flow rate of the combustion exhaust gas source, or the water supply flow rate or the generated vapor flow rate in the case of a boiler).

In addition, if the temperature of the combustion exhaust gas C' is varied, the amount of absorption of $NH_3$ onto the catalyzer is varied, and absorbing and releasing phenomena would arise. However, as the temperature rises, a balanced absorption amount is reduced, and if the temperature is abruptly raised, then the absorbed $NH_3$ is temporarily released and dispersed (the releasing and dispersing speed being proportional to the time variation rate of the combustion exhaust gas temperature), resulting in a phenomenon that the $NH_3$ concentration within the flue E rises and thus the leaked $NH_3$ amount is increased.

Figure 3:
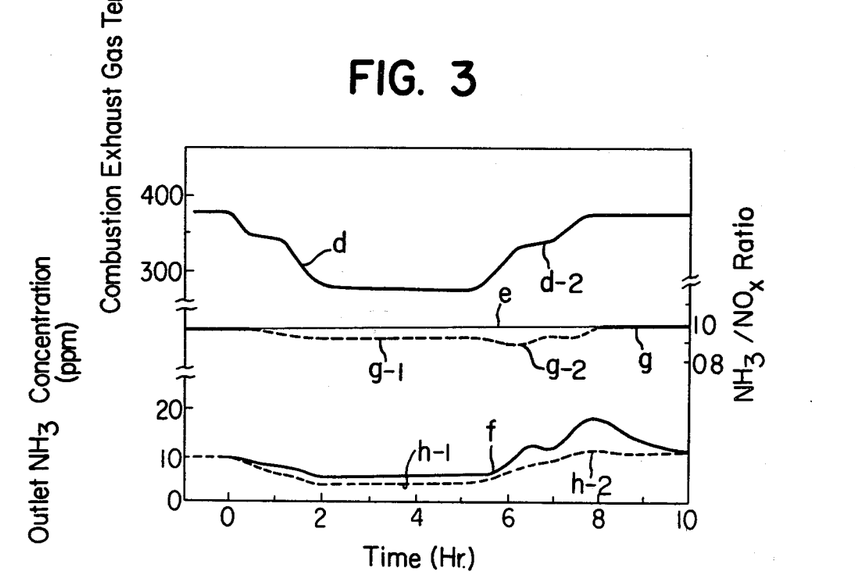
FIG. 3 is a graph showing the effects upon the amount of leaked or released $NH_3$ by the combustion exhaust gas temperature and the $NH_3/NO_x$ ratio.

Explaining this phenomenon with reference to FIG. 3, if a combustion exhaust gas temperature is varied with respect to time as indicated by a solid line curve d, then in the case of a constant $NH_3/NO_x$ ratio as shown by a solid straight line e, the $NH_3$ concentration within the flue E will present a temporary peak upon a temperature rise (the solid line curve d-2), as shown by a solid line curve f. Thus it can be seen that a loss of $NH_3$ will occur and the increased $NH_3$ causes an adverse effect on the installation equipment succeeding the flue E.

Therefore, according to the present invention, as described previously with respect to processor (II), the $NH_3/NO_x$ ratio is set and stored so that during low temperature operation, the $NH_3/NO_x$ ratio may have a low value for the purpose of reducing the amount of absorption of $NH_3$ onto the catalyzer. Thereby, as shown by the dotted line curve g-1 in FIG. 3, the $NH_3/NO_x$ ratio is lowered during such low temperature operation and thus a reduction in the amount of absorption of $NH_3$ by the catalyzer can be achieved.

Figure 4:
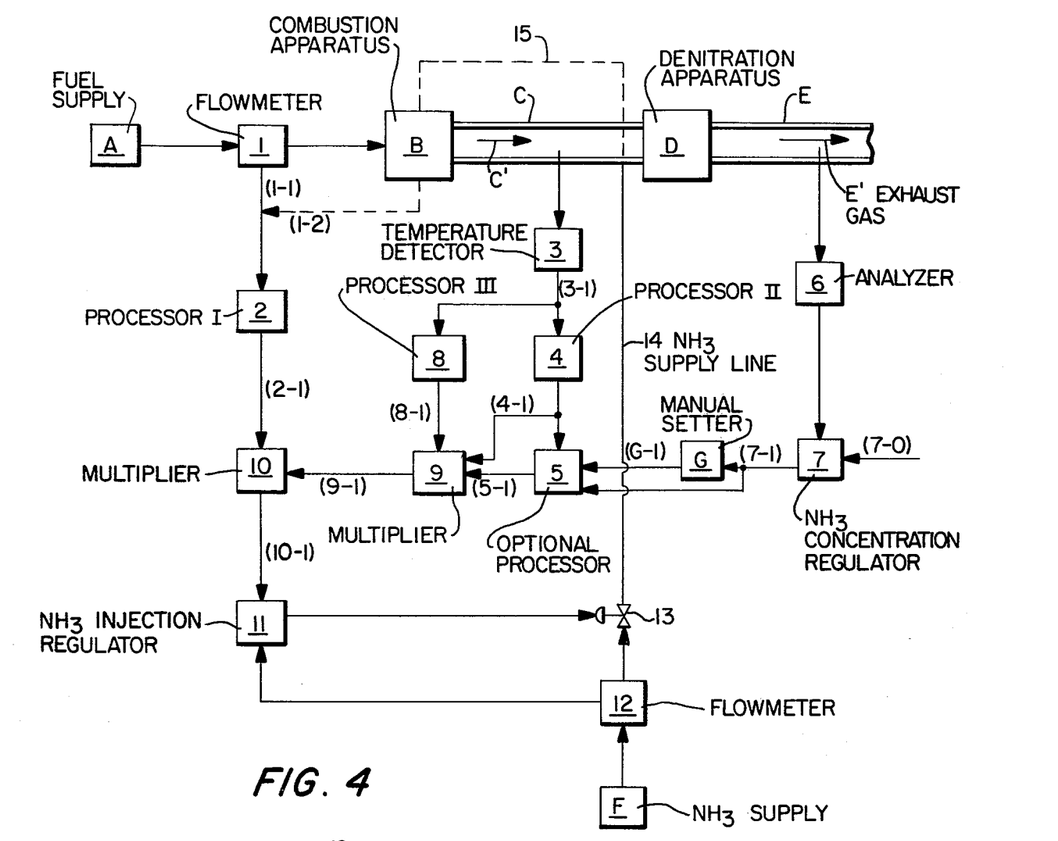
FIG. 4 is a flow diagram showing another preferred embodiment of the present invention.

Furthermore, in another preferred embodiment of the present invention, as shown in the flow diagram of FIG. 4, in order to prevent $NH_3$ from leaking upon a rise in temperature, a temperature variation rate processor 8 is provided; that is, a processor (III) is provided in which, on the basis of the relationship between the time variation rate of the temperature of the combustion exhaust gas G' and an $NH_3/NO_x$ ratio, a characteristic factor for correcting the $NH_3/NO_x$ ratio is derived and stored as a function of the time variation rate of the temperature; a temperature signal (3-1) is transmitted to the temperature variation rate processor 8, wherein a negative signal serving to reduce the $NH_3/NO_x$ ratio upon a temperature rise (that is, a solid line curve d-2 in FIG. 3) is generated as an $NH_3/NO_x$ raio correction signal (8-1). This signal (8-1) is transmitted to a multiplier 9 where the signal (8-1) is multiplied by either the $NH_3/NO_x$ characteristic signal (4-1) or the $NH_3/NO_x$ ratio signal (5-1) transmitted from the above-described temperature characteristic processor 4 or the processor 5, respectively, and then the product signal is transmitted to the above-described multiplier 10 as a corrected $NH_3/NO_x$ ratio signal (9-1). Signal flow paths succeeding the multiplier 10 are identical to those described with reference to FIG. 1A.

Explaining now the effects of the above-described modified embodiment with reference to FIG. 3, upon a low operation temperature, as described above, the $NH_3/NO_x$ ratio takes somewhat lower values as indicated by a dotted line curve g-1, the $NH_3$ concentration within the flue E is also held at somewhat lower values than the values of the solid line curve f as shown by a dotted line curve h-1; upon a temperature rise (a solid line curve d-2) the temperature variation rate output becomes negative resulting in temporary lower values of the $NH_3/NO_x$ ratio as shown by a dotted line curve g-2, so that even if the $NH_3$ released from the catalyzer is added, the $NH_3$ concentration within the flue E does not reach a peak, as shown by a dotted line curve h-2, and therefore, the leaked $NH_3$ amount is reduced and a stable result can be obtained.

Furthermore, in the present invention, in either case of the embodiments in FIGS. 1A, 1B and 4, a further modification can be made such that the $NH_3$ concentration in the processed gas E' is detected by an analyzer 6, the detected signal is transmitted to an $NH_3$ concentration regulator 7, where a deviation of that signal from the desired $NH_3$ value transmitted to the regulator 7 as another input signal (7-0) is derived and outputted as an $NH_3$ concentration control signal (7-1); either the output signal (7-1) is transmitted to the above-described setter G where it is added to or subtracted from the signal representing the desired $NH_3/NO_x$ ratio upon steady operation so as to correct the desired $NH_3/NO_x$ ratio, or the output signal (7-1) is transmitted directly to the processor 5 where it is added to or subtracted from the $NH_3/NO_x$ characteristic signal (4-1) to correct the $NH_3/NO_x$ characteristic signal. If such a provision is made, even when a combustion condition in the combustion apparatus B has been varied, resulting in variations of the denitration performance thereby causing deviations from the optimum $NH_3/NO_x$ ratio, the $NH_3/NO_x$ ratio can be corrected and the leaked $NH_3$ amount can be kept to a minimum.

It is to be noted that the present invention is not limited to the above-described catalytic denitration process but it is equally applicable to a non-catalytic denitration process. In the case of the non-catalytic denitration process, the detected combustion exhaust gas temperature of the reaction zones of $NH_3$ and $NO_x$ within a combustion apparatus (corresponding to the apparatus B in FIGS. 1 and 4) is used as a temperature signal (corresponding to the signal (3-1) in FIGS. 1A, 1B, and 4), and in a processor (II), (that is, a processor corresponding to the processor 4 in FIGS. 1A and 1B), the $NH_3/NO_x$ ratio as a function of the combustion exhaust gas temperature, is derived and stored on the basis of the relationship between the combustion exhaust gas temperature of the reaction zones of $NH_3$ and $NO_x$ and the denitration performance. Then, as in the case of the above-described catalytic denitration process, the optimum $NH_3/NO_x$ ratio is preset and $NH_3$ is injected into the above-described combustion apparatus through a line designated by reference numeral 15 in FIGS. 1A and 4.

The effects of the above-described present invention can be summarized as follows:

(i) Since the derivation of the amount of $NO_x$ in a combustion exhaust gas is effected in such manner that an $NO_x$ amount signal is generated by inputting a signal representing either the fuel flow rate, the combustion air flow rate, the combustion exhaust gas flow rate, the water supply flow rate or the generated vapor flow rate to the processor (1) in which the relationship between these flow rates and the amount of $NO_x$ is stored, and since the generated $NO_x$ amount signal is used as a signal for controlling the amount of injection of $NH_3$; the system response is quicker than that of a $NO_x$ analyzer as referred to previously in connection to the shortcoming (1) of the heretofore known control method, and so, it is possible to optimize the denitration performance following abrupt variations.

(ii) Since use is made of a processor (II) in which the $NH_3/NO_x$ ratio is stored as a function of the exhaust gas temperature on the basis of the relationship between the combustion exhaust gas temperature and the denitration performance, taking into consideration the activity temperature characteristics of the catalyzer in a catalytic denitration process or the reaction temperature characteristics in a non-catalytic denitration process, the optimum $NH_3/NO_x$ ratio signal can be always derived, and thereby a flat characteristic for the denitration rate can be achieved (resulting in an improvement over the shortcoming (2) of the heretofore known control method).

(iii) Since the optimum $NH_3/NO_x$ ratio can be set even in the case of large variations in the range of the combustion exhaust gas temperature, if the $NH_3/NO_x$ ratio is set and stored in the processor (II) in such manner that upon low temperature operation, the value of the $NH_3/NO_x$ ratio may be lowered for the purpose of reducing the amount of absorption of $NH_3$ onto the catalyzer (that is, for the purpose of preventing poisoning of the catalyzer); the interrupting of the denitration by stopping the injection of $NH_3$ as described above in connection with the shortcoming (3) of the heretofore known control method can be prevented, and so, continuous denitration is possible.

(iv) Since reduction of the leaked $NH_3$ amount can be achieved by providing the processor (III) which can correct the $NH_3/NO_x$ ratio according to the detected time variation rate of a combustion exhaust gas temperature; $NH_3$ can be utilized effectively, and the prevention of a public nuisance as well as the prevention of adverse effects upon the elements succeeding the denitration apparatus can be achieved (resulting in an improvement over the shortcoming (4) of the heretofore known control method).

(v) An arbitrary desired denitration rate can be realized by assembling the heretofore known manual $NH_3/NO_x$ ratio setter and multiplying a signal representing the desired $NH_3/NO_x$ ratio in steady operation that is arbitrarily set in the setter by an $NH_3/NO_x$ ratio signal derived from the above-described processor (II).

(vi) By additionally providing a circuit in which, after a deviation signal from the desired $NH_3$ value has been derived from the signal representing the $NH_3$ concentration in the processed gas, the deviation signal is fed back as an $NH_3$ concentration control signal, even in the case where the combustion condition has been varied so as to result in a variation of the denitration performance and thereby causing a deviation from the optimum $NH_3/NO_x$ ratio, it is possible to make a correction to the system and to minimize the leaked $NH_3$.

(vii) Even in a denitration system in which both a non-catalytic denitration process and a catalytic denitration process are employed in combination, the control of injection of $NH_3$ can be easily achieved.

Processors I–III, which have been previously described are commercially available units and for the sake of brevity, their operation has not been discussed in great detail in the specification. Appendix I contains additional information regarding the operation of Processors I–III. Appendix II is an English translation of pertinent portions of the operating manual of the actual processors used in the present invention.

While the principle of the present invention has been described above in connection with a specific apparatus, it is to be clearly understood that this description is made only by way of example and not as a limitation to the scope of the invention as set forth in the accompanying claims.

APPENDIX I (A) Construction of Processor I

Figure 5:
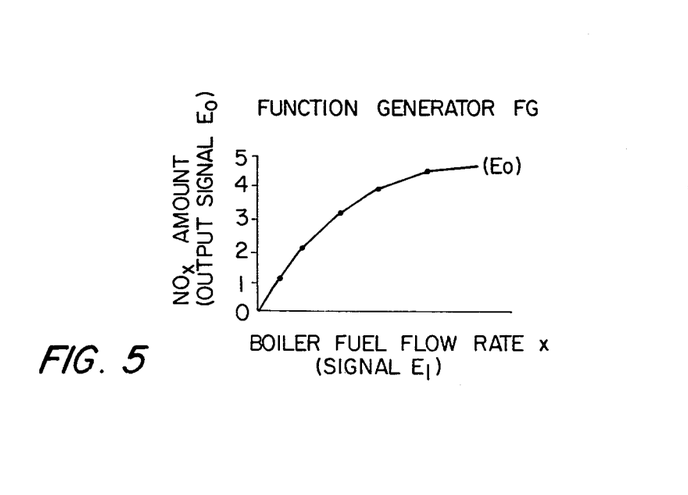
FIGS. 5–7 are characteristic curves used in Appendix I to describe the operation of processors I–III.

In the processor I, the correlation between the fuel flow rate and the amount of $NO_x$ as shown in FIG. 5 is preliminarily investigated and is set for memory in the function generator ("Function Generator FG" in Appendix II), and in response to the input signal $E_1$ or x the signal $E_o$ representing the amount of $NO_x$ is output to be used for further calculation, as follows:

$$E_o = F(x) + B.$$

where B represents a bias voltage.

(b) Construction of Processor II

Figure 6:
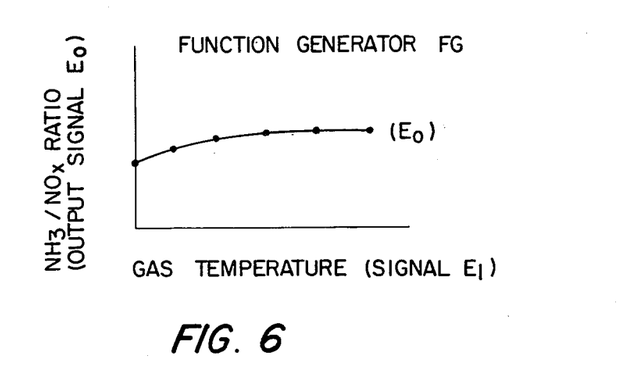

In the processor (II), the correlation between the gas temperature and the $NH_3/NO_x$ ratio is preliminarily investigated and is set for memory in the function generator which has the same function as that included in the processor (I), and in response to the input signal $E_1$ representing the gas temperature, the output signal representing the $NH_3/NO_x$ ratio is derived. (See FIG. 6).

(c) Construction of Processor (III)

Figure 7:
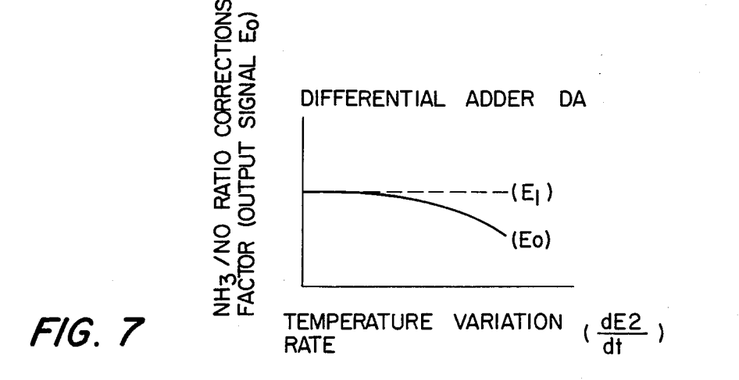

In this processor (III), an $NH_3/NO_x$ ratio correction signal (8-1) is derived from a variation rate of the temperature signal (3-1), that is, $(dE2)/(dt)$. That is, the temperature signal (3-1) is applied as a signal $E_2$ to a differential adder ("Differential Adder DA" in Appendix II), and thereby an output signal $E_o$ (8-1) that is more negative than fixed value $E_1$ is generated, in the following form:

$$E_o = +E_1 - K\frac{dE2}{dt} + B$$

where K is a differentiation period, $E_1$ is an input which is selected to be zero, and a bias voltage B is preset. (See FIG. 7).

APPENDIX II

Translation of Technical Information

Note: The original printed matter written in the Japanese language is an operation manual entitled "Operation Manual of MS Control System Function Module" prepared by the manufacturer of the processors (I), (II)

and (III), Kabushiki Kaisha Shimazu Seisakusho in Japan, such modules being actually used in practicing the present invention.

Function Generator FG

Operational Capability:

A function generator operates to convert an input signal into an output according to any arbitrary non-linear function, which is formed of polygonal line segments in combination. The number of the polygonal line segments is 3 or 6. The shape of the function is, in its standard forms, monotonously increasing and either downwardly convex or upwardly convex. In Table 1, the kinds of the function shapes are indicated.

TABLE 1

| Model | Direction of Convexness | The Number of the polygonal line segments |
|---|---|---|
| FG 1311 | downwards | 3 |
| 1611 | | 6 |
| 2311 | upwards | 3 |
| 2611 | | 6 |

Figure 12:
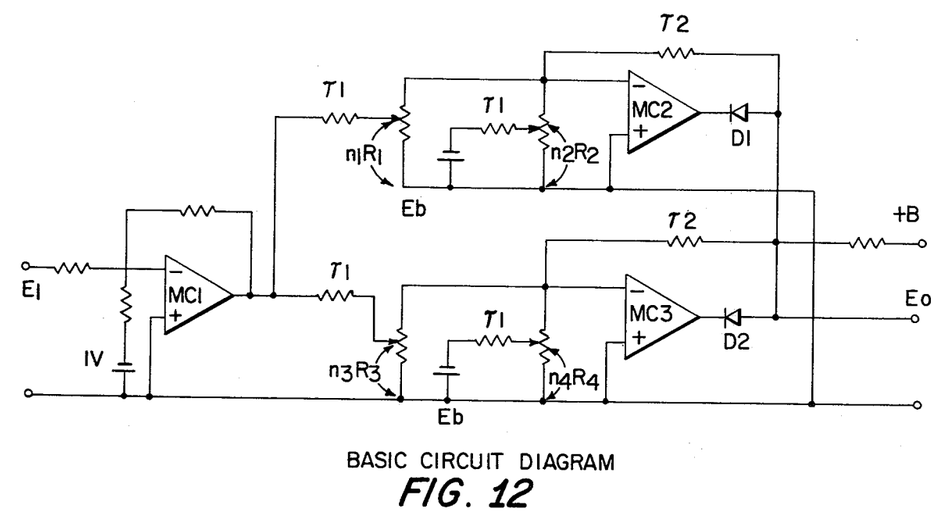
FIGS. 12–16 are circuit diagrams and graphs used in Appendix II to describe the operation of a commercially available function generator which may be utilized in an embodiment of the present invention.
Figure 13:
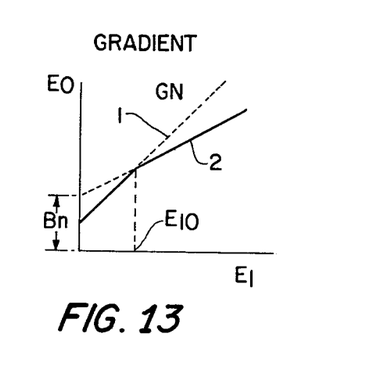

Operation Principle:

FIG. 12 is a basic circuit diagram in the case where only two polygonal line segments are picked up from FG 2-11 (upwardly convex). Assuming now that $n_3=0$ and $n_4=1$ are fulfilled, the output of MC2 takes the positive maximum value, and diode D2 becomes non-conducting. Accordingly, the following formula is derived from the circuit containing MC1 and MC2:

$$E_o = \frac{10(E_1 - 1)}{\frac{1}{n_1} + 10(1 - n_1)} + \frac{10\, Eb}{\frac{1}{n_2} + 10(1 - n_2)}$$

where we assume that $r_2/r_1 = 10$, $R_1/r_1 = R_2/r_1 = 10$ are fulfilled. Accordingly, if $n_1$ and $n_2$ are appropriately preset, a straight line ① in FIG. 13 can be obtained. Next, if $n_1=0$ and $n_2=1$ are chosen and $n_3$ and $n_4$ are appropriately preset, then a straight line ② is obtained. After the parameters $n_1$, $n_2$, $n_3$ and $n_4$ have been thus preset, when the input $E_1$ is increased, up to the point of input $E_1 = E_{10}$, since the output of MC3 is at the positive maximum value, the output varies along the gradient of the straight line ①. If the input exceeds the value of $E_1 = E_{10}$, then the output of MC2 goes to the positive maximum value, and hence the output varies along the gradient of the straight line ②. In this way, by increasing the circuits associated with MC2 and MC3, a polygonal approximate curve consisting of further line segments can be obtained.

Method for Adjustment:

TABLE 2

| Terminals | Test Device | |
|---|---|---|
| 2 & 22 | Constant voltage device | +24 V |
| 4 & 22 | Constant voltage device | −24 V |
| 5 & 21 | Reference voltage generator | 0~10 V |
| 18 & 22 | High-precision potentiometer | 0~10 V |

Figure 14:
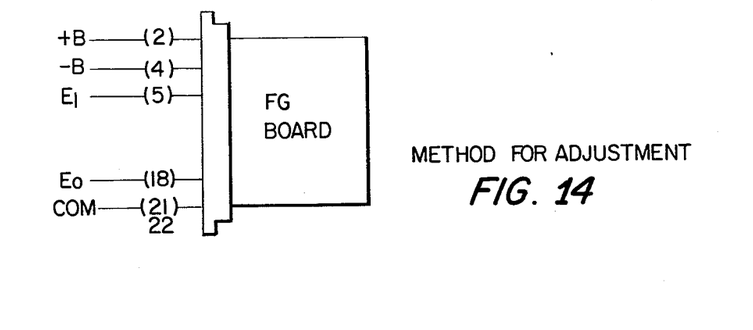

As shown in FIG. 14, test devices as indicated in Table 2 are connected across the respective terminal pairs. Power supply voltage is switched ON and after warming-up has been effected for about 20 minutes, and adjustment should be carried out in the following sequence: (upwardly convex)

(1) Adjustment of an input bias voltage

The input $E_1$ is set at $1.000\ V \pm 2$ mV, and a trimmer VR1 is adjusted so that the potential difference between CP1 and a white test jack (COM) may become $0.000\ V \pm 4$ mV.

(2) Adjustment of polygonal line segments

Figure 15:
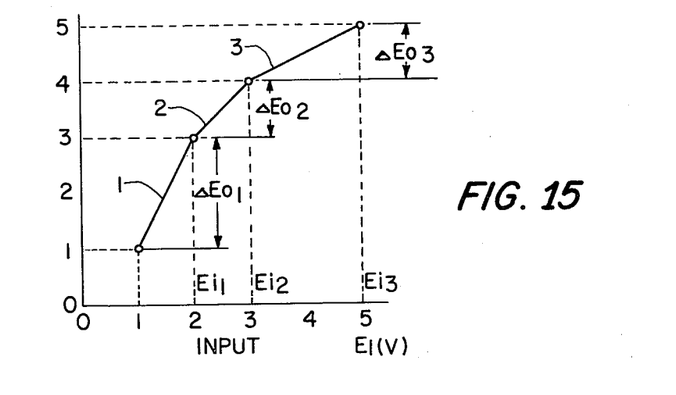

For instance, description will be made in the case where polygonal line approximation as shown in FIG. 15 is effected. From this figure, it is read out that the straight line ① has a gradient of 2, the straight line ② has a gradient of 1 and the straight line ③ has a gradient of 0.5.

Trimmers VR2~VR7 for the gains of MC3 to MC7 are fully turned in the anti-clockwire direction. Subsequently, trimmers VR8 to VR13 for biasing are fully turned in the clockwise direction.

The input $E_1$ is set at $2.000\ V \pm 2$ mV ($E_{i1}$), and a trimmer VR2 is adjusted so that the potential difference between CP2 and COM may take the value of $2.000 \pm 4$ mV ($\Delta E_{o1}$).

Next, a trimmer VR3 is adjusted so that the potential difference between CP2 and COM may take the value of $1.000 \pm 4$ mV ($\Delta E_{o2}$).

VR9 is adjusted so that when an input $E_1$ of $3.000\ V \pm 2$ mV ($E_{i2}$) is applied, the output may become $3.000\ V \pm 4$ mV.

VR4 is adjusted so that when an input $E_1$ of $5.000\ V \pm 2$ mV ($E_{i3}$) is applied, the difference between CP2 and COM may become $2.000\ V \pm 4$ mV, and also VR10 is adjusted so that the output at that time may become $4.000\ V \pm 4$ mV.

(3) Adjustment of an output gain and adjustment of an output bias $B_o$

A trimmer VR14 is adjusted so that when the input $E_1$ is set at $1.000\ V \pm 2$ mV, the output $E_o$ may become $1.000 \pm 4$ mV. Next, the input $E_1$ is set at $5.000\ V \pm 2$ mV, and a trimmer VR15 is adjusted so that the output $E_o$ may become $5.000\ V \pm 4$ mV. By repeating the above operations, adjustment is carried out so that for the input $E_1$ of $1.000\ V \pm 2$ mV the output $E_o$ may become $1.000\ V \pm 4$ mV, and for the input $E_1$ of $5.000\ V \pm 2$ mV the output $E_o$ may become $5.000\ V \pm 4$ mV.

FG 1 (downwardly convex)

Figure 16:
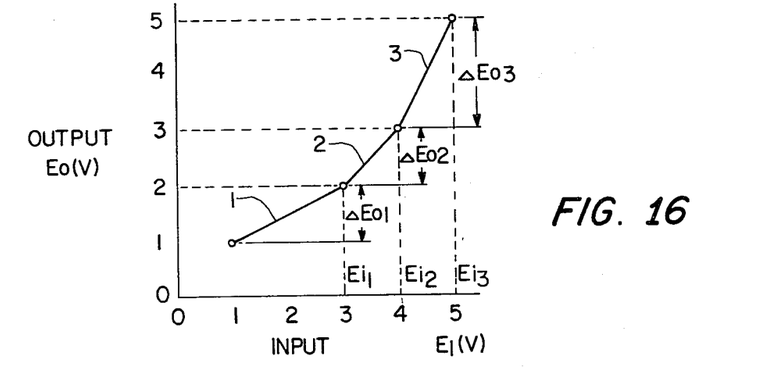

For instance, in the case of effecting polygonal line approximation shown in FIG. 16, the values of $E_{i1}$, $E_{i2}$ and $E_{i3}$ in the case of FG 2-11 are chosen to be 3 V, 4 V and 3 V, respectively, and the values of $\Delta E_{o1}$, $\Delta E_{o2}$ and $\Delta E_{o3}$ are set at 1 V, 3 V, and 4 V, respectively. Then the adjustment can be achieved through exactly the same operations.

However, it is to be noted that before starting the adjustment, all the trimmers VR2 to VR7 and VR8 to VR13 should be fully turned in the clockwise direction and then the adjustment should be commenced.

Differential Adder DA

Operational Capability:

A differential adder has a calculation capability of deriving an output $E_o$ as shown in Table 3 and Table 4 in response to inputs $E_1$ and $E_2$. By varying a part of the component parts and mounting positions of jumpers, various calculation formulae can be obtained.

TABLE 3

| Models | Calculation formulae | Jumper positions | Unnecessary component parts |
|---|---|---|---|
| DA10_ | $E_o = +E_1 + K \frac{dE_2}{dt} + B$ | N-P, D-F<br>G-E, Q-O | R8~10, D3~6, MC4, R29~30 |
| | $E_o = -E_1 + K \frac{dE_2}{dt} + B$ | N-O, D-F | R8~10, D3~6, MC4, R29~30 |
| | $E_o = +E_1 - K \frac{dE_2}{dt} + B$ | N-P, D-E | R8~10, D3~6, MC4, R29~30 |
| | $E_o = -E_1 - K \frac{dE_2}{dt} + B$ | N-O, D-E<br>R-P, H-F | R8~10, D3~6, MC4, R29~30 |
| DA20_ | $E_o = +E_1 + K \left\lvert \frac{dE_2}{dt} \right\rvert + B$ | N-P, D-F, I-K<br>G-E, Q-O, L-J | D3, D4 |
| | $E_o = +E_1 - K \left\lvert \frac{dE_2}{dt} \right\rvert + B$ | N-P, D-E, I-J<br>M-K | " |
| | $E_o = -E_1 + K \left\lvert \frac{dE_2}{dt} \right\rvert + B$ | N-O, D-F, I-K<br>L-J | " |
| | $E_o = -E_1 - K \left\lvert \frac{dE_2}{dt} \right\rvert + B$ | N-O, D-E, I-J<br>R-P, H-F, M-K | " |
| DA30_ | $E_o = +E_1 + B \left( \frac{dE_2}{dt} > O \right)$ | N-P, I-F | " |
| | $E_o = +E_1 - K \frac{dE_2}{dt} + B \left( \frac{dE_2}{dt} < O \right)$ | G-E, Q-O | " |
| | $E_o = -E_1 + B \left( \frac{dE_2}{dt} > O \right)$ | | " |
| | $E_o = -E_1 - K \frac{dE_2}{dt} + B \left( \frac{dE_2}{dt} < O \right)$ | N-O, I-F | " |
| | $E_o = +E + B \left( \frac{dE_2}{dt} > O \right)$ | | " |
| | $E_o = +E_1 + K \frac{dE_2}{dt} + B \left( \frac{dE_2}{dt} < O \right)$ | N-P, I-E | " |
| | $E_o = -E_1 + B \left( \frac{dE_2}{dt} > O \right)$ | N-O, I-E | " |
| | $E_o = -E_1 + K \frac{dE_2}{dt} + B \left( \frac{dE_2}{dt} < O \right)$ | R-P, H-F | " |
| DA40_ | $E_o = +E_1 + B \left( \frac{dE_2}{dt} < O \right)$ | | |
| | | N-P, I-E | D5, D6 |
| | $E_o = +E_1 + K \frac{dE_2}{dt} + B \left( \frac{dE_2}{dt} > O \right)$ | | |
| | | N-O, I-E | " |
| | $E_o = -E_1 + B \left( \frac{dE_2}{dt} < O \right)$ | | |
| | | R-P, H-F | " |
| | $E_o = -E_1 + K \frac{dE_2}{dt} + B \left( \frac{dE_2}{dt} > O \right)$ | | |
| | | N-P, I-F | " |
| | $E_o = +E_1 + B \left( \frac{dE_2}{dt} < O \right)$ | | |
| | | G-E, Q-O | " |
| | $E_o = +E_1 - K \frac{dE_2}{dt} + B \left( \frac{dE_2}{dt} > O \right)$ | | |
| | $E_o = -E_1 + B \left( \frac{dE_2}{dt} < O \right)$ | | |
| | | N-O, I-F | " |

TABLE 3-continued

| Models | Calculation formulae | Jumper positions | Unnecessary component parts |
|---|---|---|---|

$$E_o = -E_1 - K \frac{dE_2}{dt} + B \left( \frac{dE_2}{dt} > 0 \right)$$

In the above Table 3 K represents a differentiation period, which can be preset at 0~10 minutes by means of a dial on a front panel. A differentiation gain can be varied from 1 to 10, and it can be adjusted by a trimmer on the front of a board similarly to a bias B. Among the respective calculation formulae, the number of component parts is identical in each of the four groups DA 10__, DA 20__, DA 30__ and DA 40__, but in the respective groups the signs (±) can be varied by changing the mounting positions of jumpers.

Figure 8:
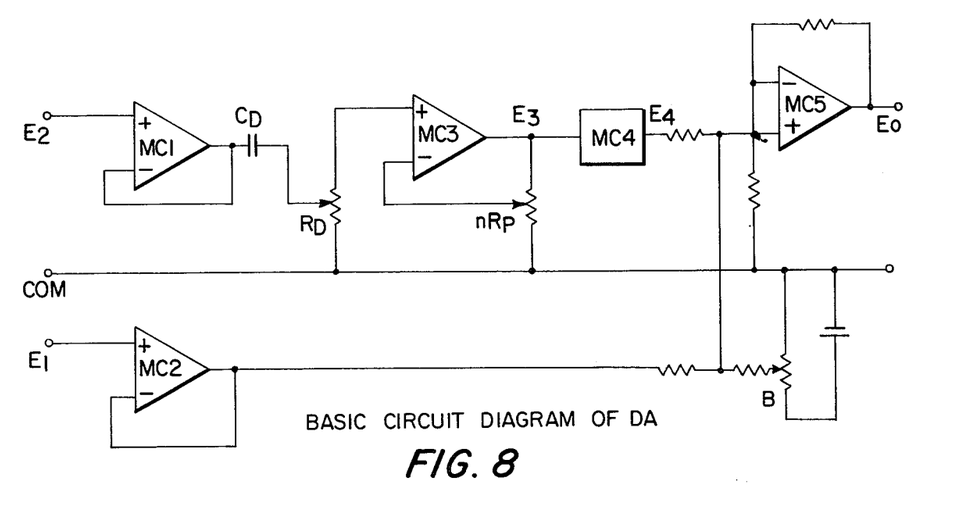
FIGS. 8–11 are circuit diagrams and a graph used in Appendix I to describe the operation of a commercially available differential adder which may be utilized in an embodiment of the present invention.

Operation Principle:

In FIG. 8, $E_2$ represents an input to be subjected to differentiation, and $E_1$ represents another input to be added. $E_2$ is applied through a buffer amplifier MC1 to a differentiation circuit, and the output $E_3$ of the circuit takes the following form:

$$E_3(S) = \frac{1}{n} \cdot \frac{C_D R_D S}{1 + C_D R_D S} E_2(S)$$

Figure 9:
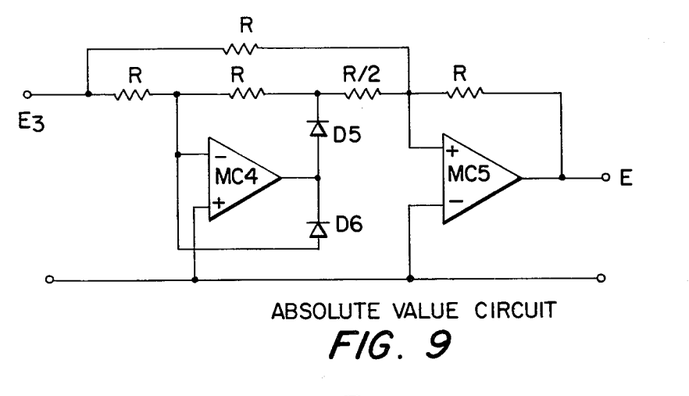

When it is not converted into an absolute value as is the case with the model DA 10__, $E_1$, $E_3$ and B are added in MC5, and the output $E_o$ of MC5 takes the following form:

$$E_o(S) = E_1(S) + K_o \frac{C_D R_D S}{1 + C_D R_D S} E_2(S) + B$$

where $K_o = 1/n$. On the other hand, in case where it is necessary to differentiate an absolute value for $E_2$ as is the case with the model DA 20__, an absolute value circuit as shown in FIG. 9 is added to a portion of FIG. 8. Accordingly, the calculation formula in this case takes the following form:

$$E_o(S) = E_1(S) + K_o \left| \frac{C_D R_D S}{1 + C_D R_D S} E_2(S) \right| + B$$

Method for Adjustment

Figure 10:
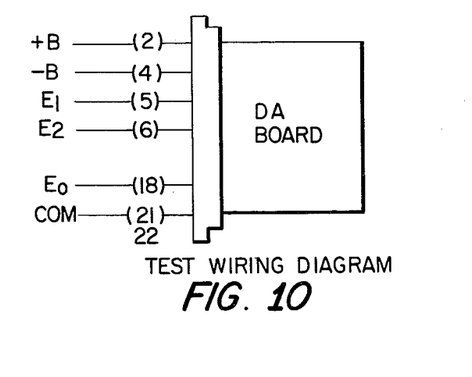

As shown in FIG. 10, test devices indicated in Table 4 are connected between the respective terminals. A power supply voltage is switched ON, and after warming-up has been effected for about 5 minutes, adjustment is effected in the following sequence:

TABLE 5

| Terminals | Test devices | |
|---|---|---|
| 2 & 22 | Constant voltage device | +24 V |
| 4 & 22 | Constant voltage device | −24 V |
| 5 & 21 | Reference voltage generator | 1~5 V |
| 6 & 21 | Ramp function generator | 1~5 V |
| 18 & 22 | High-precision voltage measuring device | 1~5 V |

(1) Adjustment of an offset voltage of MC3

A trimmer VR3 is fully turned in the clockwise direction.

Terminal 1 of VR1 and COM are short-circuited, and VR2 is adjusted so that the voltage at CP1 may fall within the range of ±2 mV.

(2) Adjustment of a gain of MC5

A trimmer VR5 is fully turned in the anti-clockwise direction, a bias B is set at 0 and 5 V±4 mV is applied to $E_1$. A trimmer VR4 is adjusted so that the output $E_o$ at this moment may become 5 V±4 mV.

(3) Adjustment of a bias B

A magnitude of a bias B that is necessary for a given calculation formula is determined by adjusting a trimmer VR5.

(4) Adjustment of a differentiation period

Figure 11:
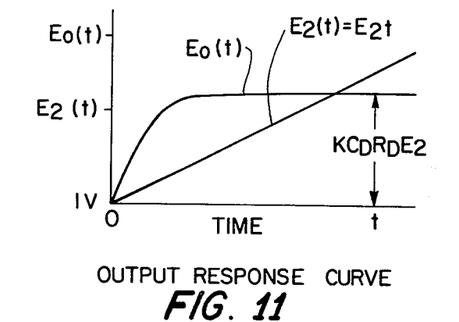

A differentiation period is indexed on a dial, and this differentiation period is a value when the differentiation gain is selected at 10. The input $E_1$ is set at 1 V, and a ramp function voltage is applied to $E_2$. Then the output $E_o$ presents a response as shown in FIG. 11. The voltage $E_o = KC_D R_D E_2$ when it has become stable, is measured, and from this voltage the differentiation period $T_D$ can be determined according to the following formula:

$$T_D = \frac{E_o}{E_2} = KC_D R_D$$

This relation is indicated in Table 5. For instance, under the condition of the output voltage equal to 1 V, if a signal voltage varying at a rate of 4 V/minute is applied as a ramp input, provided that the differentiation dial is set at 1, then 1 minute later the output voltage increases by 4 V and reaches 5 V.

(5) Adjustment of a differentiation gain

Normally a differentiation gain is set at 10 folds. When it is desired to lower the differentiation gain, a trimmer VR3 is turned in the anti-clockwise direction. Then the differentiation period is also reduced in proportion to the differentiation gain.

TABLE 5

| Differentiation Dial (Minutes) | Ramp Input | Output Voltage (V) |
|---|---|---|
| 6.3 | 4V/10 minutes | 2.52 |
| 4.0 | 4V/5 minutes | 3.2 |
| 2.5 | 4V/5 minutes | 2.0 |
| 1.6 | 4V/2 minutes | 3.2 |
| 1.0 | 4V/minute | 4.0 |
| 0.63 | 4V/minute | 2.52 |
| 0.40 | 4V/0.5 minute | 3.2 |
| 0.25 | 4V/0.5 minute | 2.0 |
| 0.16 | 4V/0.5 minute | 1.28 |
| 0.10 | 4V/0.5 minute | 0.8 |

TABLE 5-continued

| Differentiation Dial (Minutes) | Ramp Input | Output Voltage (V) |
| --- | --- | --- |
| 0.063 | 4V/0.5 minute | 0.504 |

What is claimed is:

1. A method for controlling injection of ammonia in a dry type of exhaust gas denitration process, in which ammonia is injected into and mixed with a combustion exhaust gas containing nitrogen oxides to decompose and remove said nitrogen oxides; comprising the steps of:
    (a) deriving and storing, on the basis of a predetermined relationship between a produced nitrogen oxides concentration and a numerical value representing the amount of combustion, the amount of nitrogen oxides as a function of the numerical value representing the amount of combustion;
    (b) deriving and storing, on the basis of a predetermined relationship between the combustion exhaust gas temperature and the denitration performance, the ratio of ammonia to nitrogen oxides as a function of the combustion exhaust gas temperature;
    (c) deriving the optimum amount of injection of ammonia by multiplying the amount of nitrogen oxides obtained from step (a) by the ratio of ammonia to nitrogen oxides obtained from step (b), and controlling the amount of injected ammonia to equal the derived optimum amount.

2. A method for controlling injection of ammonia in a dry type of exhaust gas denitration process, in chich ammonia is injected into and mixed with a combustion exhaust gas containing nitrogen oxides to decompose and remove said nitrogen oxides; comprising the steps of:
    (a) deriving and storing, on the basis of a predetermined relationship between a produced nitrogen oxides concentration and a numerical value representing the amount of combustion, the amount of nitrogen oxides as a function of the numerical value representing the amount of combustion;
    (b) deriving and storing, on the basis of a predetermined relationship between the combustion exhaust gas temperature and the denitration performance, the ratio of ammonia to nitrogen oxides as a function of the combustion exhaust gas temperature;
    (c) deriving and storing, on the basis of a predetermined relationship between the time variation rate of change of the combustion exhaust gas temperature and the ratio of ammonia to nitrogen oxides, a characteristic factor for correcting the ratio of ammonia to nitrogen oxides as a function of the time variation rate of change of the exhaust gas temperature;
    (d) deriving the optimum amount of injection of ammonia by multiplying the amount of nitrogen oxides obtained from step (a) by the ratio of ammonia to nitrogen oxides obtained from step (b) as corrected by the correction factor of step (c), and controlling the amount of injected ammonia to equal the derived optimum amount.

3. A system for controlling injection of ammonia in a dry type of exhaust gas denitration process, in which ammonia is injected into and mixed with a combustion exhaust gas containing nitrogen oxides to decompose and remove said nitrogen oxides; comprising:
    first means for deriving and storing, on the basis of a predetermined relationship between a produced nitrogen oxides concentration and a numerical value representing the amount of combustion, the amount of nitrogen oxides as a function of the numerical value representing the amount of combustion;
    second means for deriving and storing, on the basis of a predetermined relationship between the combustion exhaust gas temperature and the denitration performance, the ratio of ammonia to nitrogen oxides as a function of the combustion exhaust gas temperature;
    means for deriving the optimum amount of injection of ammonia by multiplying the amount of nitrogen oxides obtained from the first means by the ratio of ammonia to nitrogen oxides obtained by the second means, and means for controlling the amounts of injected ammonia to equal the derived optimum amount.

4. A system for controlling injection of ammonia in a dry type of exhaust gas denitration process, in which ammonia is injected into and mixed with a combustion exhaust gas containing nitrogen oxides to decompose and remove said nitrogen oxides; comprising:
    first means for deriving and storing, on the basis of a predetermined relationship between a produced nitrogen oxides concentration and a numerical value representing the amount of combustion, the amount of nitrogen oxides as a function of the numerical value representing the amount of combustion;
    second means for deriving and storing, on the basis of a predetermined relationship between the combustion gas temperature and the denitration performance, the ratio of ammonia to nitrogen oxides as a function of the combustion exhaust gas temperature;
    third means for deriving and storing, on the basis of a predetermined relationship between the time variation rate of change of the combustion exhaust gas temperature and the ratio of ammonia to nitrogen oxides, a characteristic factor for correcting the ratio of ammonia to nitrogen oxides as a function of the time variation rate of change of the exhaust gas temperature;
    means for deriving the optimum amount of injection of ammonia by multiplying the amounts of nitrogen oxides obtained from the first means by the ratio of ammonia to nitrogen oxides obtained from the second means as corrected by the correction factor obtained from the third means, and means for controlling the amount of injected ammonia to equal the derived optimum amount.

* * * * *